United States Patent
Berstis

(10) Patent No.: US 6,182,122 B1
(45) Date of Patent: Jan. 30, 2001

(54) PRECACHING DATA AT AN INTERMEDIATE SERVER BASED ON HISTORICAL DATA REQUESTS BY USERS OF THE INTERMEDIATE SERVER

(75) Inventor: Viktors Berstis, Austin, TX (US)

(73) Assignee: International Business Machines Corporation, Armonk, NY (US)

( * ) Notice: Under 35 U.S.C. 154(b), the term of this patent shall be extended for 0 days.

(21) Appl. No.: 08/827,075

(22) Filed: Mar. 26, 1997

(51) Int. Cl.[7] .................................................... G06F 15/16
(52) U.S. Cl. ......................... 709/217; 709/203; 709/219; 709/223; 709/226; 709/229
(58) Field of Search ........................ 395/200.49, 200.33, 395/200.47, 200.53, 200.56, 200.59; 709/219, 203, 217, 223, 226, 229

(56) References Cited

U.S. PATENT DOCUMENTS

| | | | |
|---|---|---|---|
| 5,452,447 | | 9/1995 | Nelson et al. ......................... 395/650 |
| 5,659,631 | * | 8/1997 | Gormish et al. ...................... 382/166 |
| 5,673,322 | * | 9/1997 | Pepe et al. .............................. 380/49 |
| 5,727,159 | * | 3/1998 | Kikinis ............................ 395/200.76 |
| 5,754,774 | * | 5/1998 | Bittinger et al. ................. 395/200.33 |
| 5,781,901 | * | 7/1998 | Kuzma ................................... 707/10 |
| 5,802,299 | * | 9/1998 | Logan et al. ..................... 395/200.48 |
| 5,838,916 | * | 11/1998 | Domenikos et al. ........... 395/200.49 |
| 5,838,927 | * | 11/1998 | Gillon et al. ..................... 395/200.77 |
| 5,889,952 | * | 3/1999 | Hunnicutt et al. .................... 709/219 |
| 5,925,100 | * | 7/1999 | Drewry et al. ........................ 709/219 |
| 6,029,175 | * | 2/2000 | Chow et al. .......................... 707/104 |

OTHER PUBLICATIONS

A Top–10 approach to prefetching on the Web by Markatos et al., Institute of Computer Science publication, pp. 1–15, Aug. 1996.*

* cited by examiner

*Primary Examiner*—Saleh Najjar
(74) *Attorney, Agent, or Firm*—Jeffrey S. LaBaw; Felsman, Bradley, Vaden, Gunter & Dillon, LLP

(57) ABSTRACT

In a server providing access for multiple users to the World Wide Web, selected pages from periodically updated Web sites are precached. Pages linked to the home page for a Web site which are likely to be accessed by a user are retrieved and stored on the server. In response to offline browsing requests by subscribers to the Web site, the pages or portions of pages which are not already present in a subscriber's system are prioritized by likelihood of being accessed utilizing statistical information, link relationships, and/or content. The pages or page portions most likely to be accessed are compressed and transmitted to the subscriber, thus minimizing the connection time required and maximizing the number of subscribers which may be updated.

26 Claims, 7 Drawing Sheets

PRECACHING DATA AT AN INTERMEDIATE SERVER BASED ON HISTORICAL DATA REQUESTS BY USERS OF THE INTERMEDIATE SERVER

BACKGROUND OF THE INVENTION

1. Technical Field

The present invention relates in general to data processing systems and in particular to data distribution mechanisms for data processing systems. Still more particularly, the present invention relates to a mechanism for data distribution of information from the Internet to a large number of data processing systems.

2. Description of the Related Art

The Internet has become a cultural fixture as a source of both information and entertainment. Many businesses are creating Web sites as an integral part of their marketing efforts, informing consumers of the products or services offered by the business or providing other information seeking to engender brand loyalty. Many federal, state, and local government agencies are also employing Internet sites for informational purposes, particularly agencies which must interact with virtually all segments of society such as the Internal Revenue Service and secretaries of state. Operating costs may be reduced by providing informational guides and/or searchable databases of public records online.

Currently, the most commonly employed method of transferring data over the Internet is to employ the World Wide Web environment, also called simply "the Web." Other Internet resources exist for transferring information, such as File Transfer Protocol (FTP) and Gopher, but have not achieved the popularity of the Web. In the Web environment, servers and clients effect data transaction using the Hypertext Transfer Protocol (HTTP), a known protocol for handling transfer of various data files (e.g., text, still graphic images, audio, motion video, etc.). Information is formatted for presentation to a user by a standard page description language, the Hypertext Markup Language (HTML). In additional to basic presentation formatting, HTML allows developers to specify "links" to other Web resources, identified by a Uniform Resource Locator (URL). An URL is a special syntax identifier defining a communications path to specific information. Each logical block of information accessible to a client, called a "page," is identified by an URL.

Retrieval of information on the Web is generally accomplished with an HTML-compatible "browser"—a program capable of submitting a request for information identified by an URL—at the client machine. The request is submitted to a server connected to the client and may be handled by a series of servers to effect retrieval of the requested information. The information is provided to the client formatted according to HTML.

The largest segment of the consuming public does not currently have access to these Web resources. Such consumers are typically either unable or unmotivated to acquire both the requisite hardware and software and the necessary computer skills for taking advantage of these resources. While most computers currently being sold come preloaded with Internet access facilities, including Web browsers, a substantial number of households do not have personal computers. There is a need for low cost data processing systems which are simple to operate, allowing users without computer skills the opportunity to access the Internet. This need is being addressed, to some extent, by "set-top" systems, such as for example "WebTV." These systems allow a television to be rapidly switched between providing conventional television viewing, either broadcast or cable, and providing a user interface for Internet access. The user's television thus becomes part of a Web appliance.

In designing a low cost, simple data processing system for a Web appliance, however, it is necessary to presume that the target user is unsophisticated and/or inexperienced. Therefore, the operation of the data processing system must be both simple and intuitive, requiring little or no technical sophistication on the part of the user. In this regard, many of the features of conventional Web browsers must be adapted to be transparent to the user when implemented in a Web appliance.

One feature of Web browsers which would be particularly advantageous to implement in connection with Web appliances is off-line browsing. Large traffic demands to specific Web sites can make access to such sites difficult. Off-line browsing allows information at the site to be retrieved during off-peak periods without contemporaneous user interaction at the client for subsequent off-line viewing by the user. Off-line browsing is a process of viewing Web pages cached in a local memory, such as a hard drive, without connection to the Web site from which those pages originate. The pages are typically retrieved from the originating Web site by off-peak retrieval, or retrieval during periods when traffic to the site is at a minimum.

Typically, a scheduling utility allows a user to retrieve specific Web pages for storage on the user's hard drive and later viewing. While an off-line browser may provide benefits to an individual user, however, it cannot support optimization of communications between a group of clients and the Web. Individual clients, each employing off-peak information retrieval, may still tax communications resources when connected to the same server or group of servers. Such a situation will particularly arise where substantial numbers of Web appliances access the Internet through a single service provider. In addition to practical constraints on off-peak information retrieval which complicate off-line browsing in such environments, it is anticipated that service providers will limit the time allotted for off-peak information retrieval for off-line browsing.

It would be desirable, therefore, to provide an automatic and more efficient feature for downloading information from popular Internet sites to specific groups of users. Use of off-peak information retrieval by multiple users, even if staggered, creates bottlenecks between the server and the Internet and requires additional resources to satisfy the bandwidth requirements. It is further desirable, therefore, to provide a mechanism for eliminating the bandwidth requirements imposed. It would also be advantageous for the mechanism to minimize transfer time both from the source and to individual users, and to require minimal resources at the server.

SUMMARY OF THE INVENTION

It is therefore one object of the present invention to provide an improved data processing system.

It is another object of the present invention to provide an improved data distribution mechanism for data processing systems.

It is yet another object of the present invention to provide an improved method and mechanism for data distribution of information from the Internet to a large number of data processing systems.

The foregoing objects are achieved as is now described. In a server providing access for multiple users to the World Wide Web, selected pages from periodically updated Web sites are precached. Pages linked to the home page for a Web site which are likely to be accessed by a user are retrieved and stored on the server. In response to offline browsing requests by subscribers to the Web site, the pages or portions of pages which are not already present in a subscriber's system are prioritized by likelihood of being accessed utilizing statistical information, link relationships, and/or content. The pages or page portions most likely to be accessed are compressed and transmitted to the subscriber, thus minimizing the connection time required and maximizing the number of subscribers which may be updated.

The above as well as additional objects, features, and advantages of the present invention will become apparent in the following detailed written description.

DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DESCRIPTION OF THE PREFERRED EMBODIMENT

Figure 1:
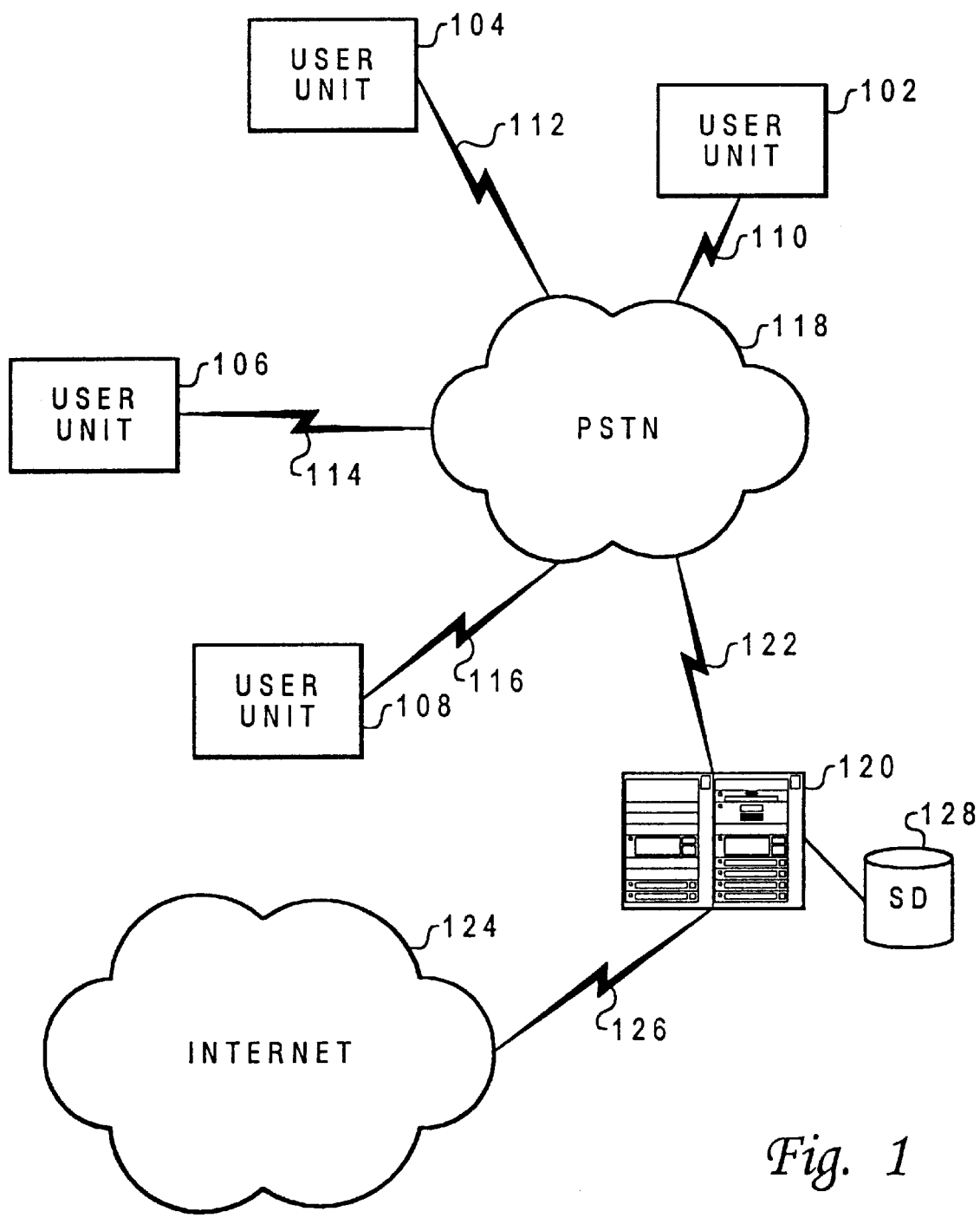
FIG. 1 depicts a distributed data processing system in which the present invention may be implemented.

With reference now to the figures, and in particular with reference to FIG. 1, a pictorial representation of a distributed data processing system in which the present invention may be implemented is depicted. User units 102, 104, 106 and 108 have communications links, 110, 112, 114 and 116 which provide these user units access to public switched telephone network (PSTN) 118. Through these communications links, the user units communicate with server 120, which is connected to PSTN 118 by communications link 122. Server 120 provides users units 102–108 access to Internet 124 via communications link 126. In addition to providing users units 102–108 access to Internet 124, server 120 also stores various configuration information, passwords, E-mail messages, and backup data on storage device (SD) 128. User units 102–108 may be located in remote geographical locations, such as California or New York. Additionally, user units 102–108 may be located on other continents on the globe.

Figure 2:
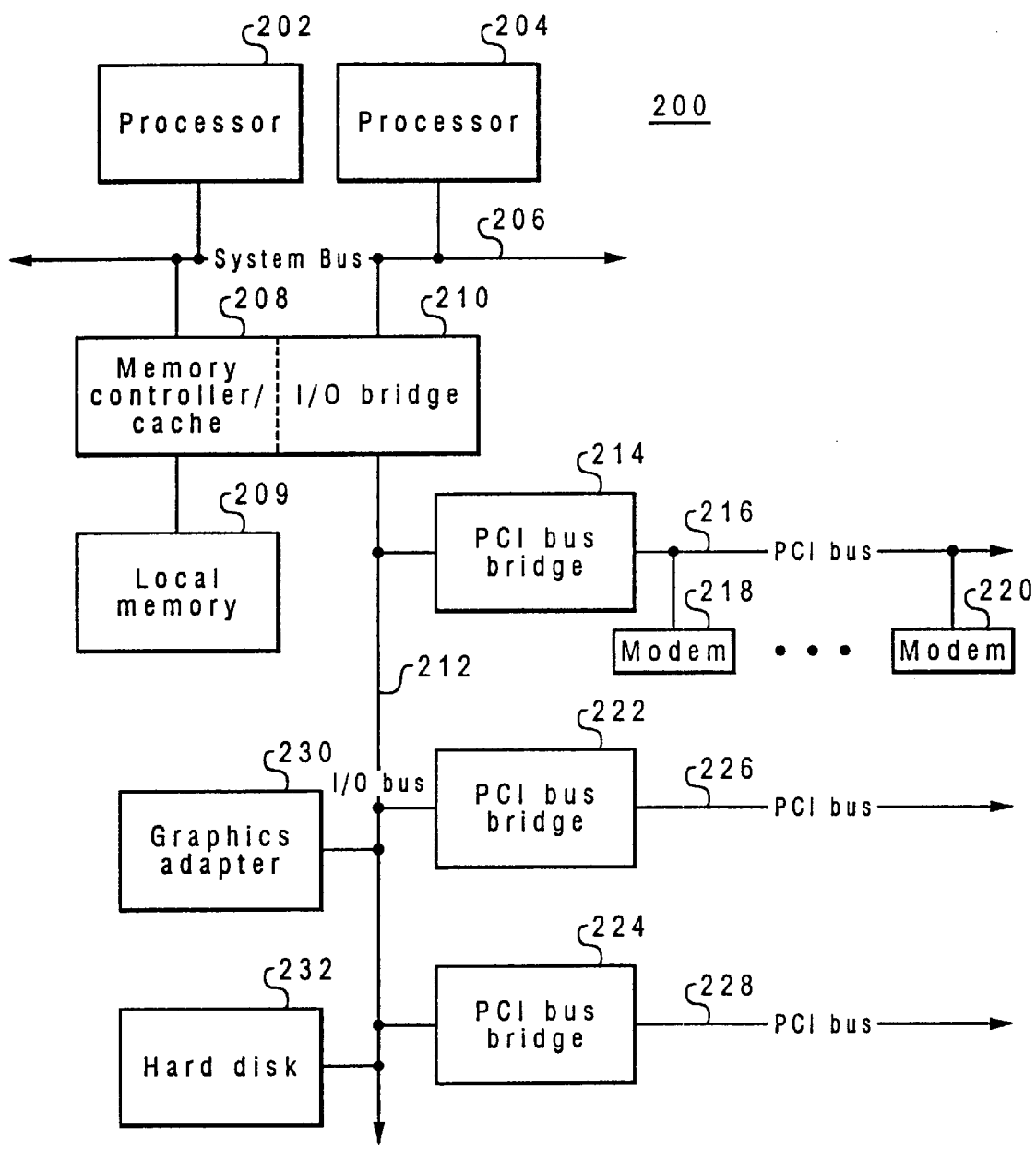
FIG. 2 is a block diagram of a data processing system which may be implemented as a server in accordance with a preferred embodiment of the present invention.

Referring to FIG. 2, a block diagram of a data processing system which may be implemented as a server, such as server 120 in FIG. 1, is depicted according to the present invention. Data processing system 200 may be a symmetric multiprocessor (SMP) system including a plurality of processors 202 and 204 connected to a system bus 206. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI bus 216. A number of modems 218–220 may be connected to PCI bus 216. Typical PCI bus implementations will support four PCI expansion slots or add-in connectors. Communications links to PSTN 118 depicted in FIG. 1 may be provided through modems 218–220 connected to PCI local bus 216 through add-in boards. Modems 218–220 in the depicted example also provide a connection to Internet 124 shown in FIG. 1.

Additional PCI bus bridges 222, 224 provide interfaces for additional PCI buses 226, 228, from which additional modems may be supported. In this manner server 200 allows dialups by multiple user units simultaneously. A memory mapped graphics adapter 230 and a hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drive and the like also may be used in addition or in place of the hardware depicted. The depicted example is not meant to imply architectural limitations with respect to the present invention.

The data processing system depicted in FIG. 2 may be, for example, an IBM RISC/System 6000 system, a product of International Business Machines Corporation in Armonk, N.Y., running the Advanced Interactive Executive (AIX) operating system. The data processing systems provides a platform for a Web server, and may be one of a group of interconnected servers employed by an Internet service provider to provide access to Web clients or user units to the Internet.

The server data processing system in accordance with a preferred embodiment of the present invention includes a Web server program, such as Netscape Enterprise Server Version 2.0, a product of Netscape Communications Corporation in Mountain View, Calif., which supports interface extensions. The server thus contains a known set of server application functions (SAFs) which accept a client's request together with configuration information and return a response. The server may also include an Application Programming Interface (API) providing extensions enabling application developers to extend or customize the SAFs through software programs commonly known as "plugins." The server supports off-line browsing by clients and provides storage for precaching Web pages. The server also implements and/or supports the processes described below for selecting Web pages for precaching and off-line downloading by clients.

Figure 3:
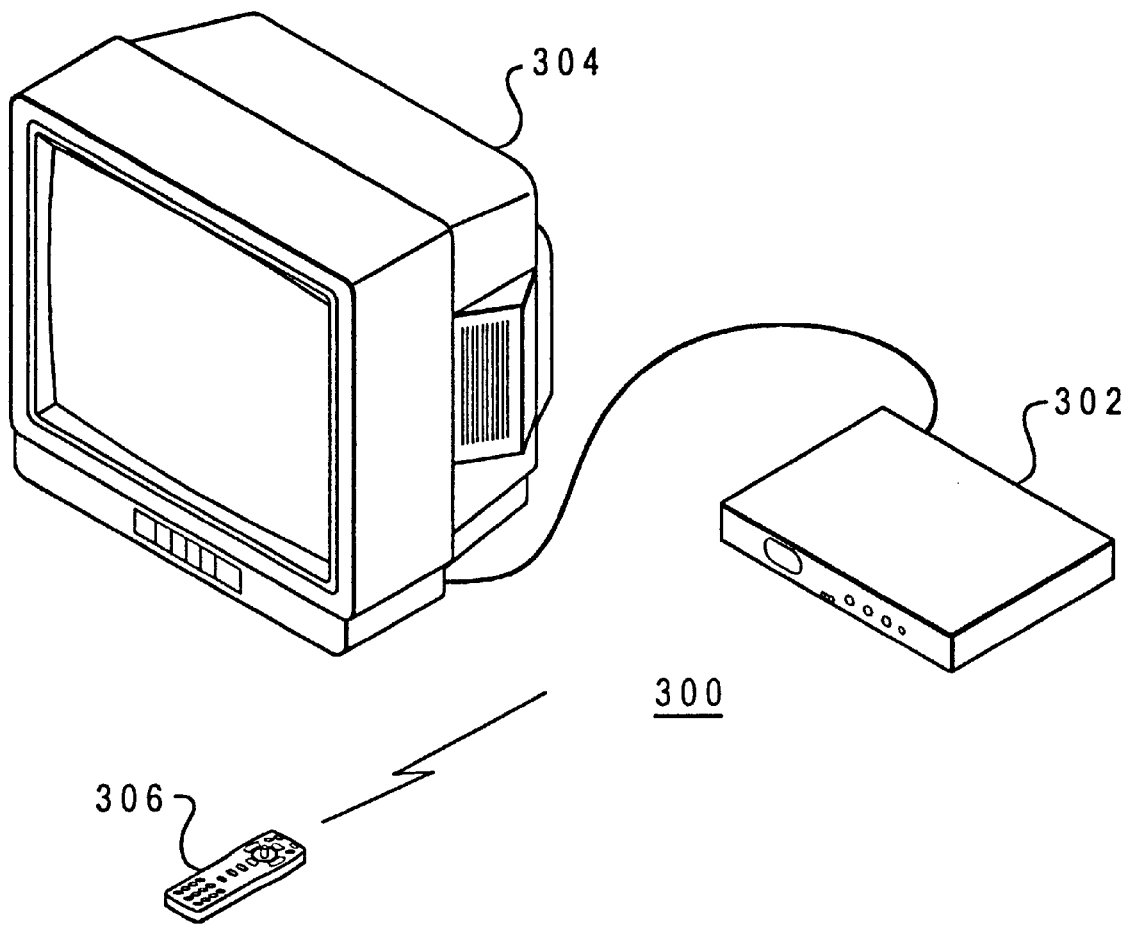
FIG. 3 depicts a pictorial representation of a data processing system which may be implemented as a user unit in accordance with a preferred embodiment of the present invention.

With reference now to FIG. 3, a pictorial representation of a data processing system which may be implemented as a user unit, such as user units 102–108 in FIG. 1, are depicted. FIG. 3 is a pictorial representation of the data processing system as a whole. Data processing system 300 in the depicted example provides, with minimal economic costs for hardware to the user, access to the Internet. Data processing system 300 includes a data processing unit 302. Data processing unit 302 is preferably sized to fit in typical entertainment centers and provides all required functionality, conventionally found in personal computers, to enable a user to "browse" the Internet. Additionally, data processing unit 302 may provide other common functions such as, for example, serving as an answering machine, transmitting or receiving facsimile transmissions, or providing voice mail facilities.

Data processing unit 302, a Web appliance, is connected to television 304 for display of graphical information. Television 304 may be any suitable television, although color televisions with an S-Video input will provide better presentations of the graphical information. Data processing unit 302 may be connected to television 304 through a standard coaxial cable connection. A remote control unit 306 allows a user to interact with and control data processing unit 302. Remote control unit 306 emits infrared (IR) signals, preferably modulated at a different frequency than the normal television, stereo, and VCR infrared remote control frequencies in order to avoid interference. Remote control unit 306 provides the functionality of a pointing device in conventional personal computers, including the ability to move a cursor on a display and select items.

Figure 4:
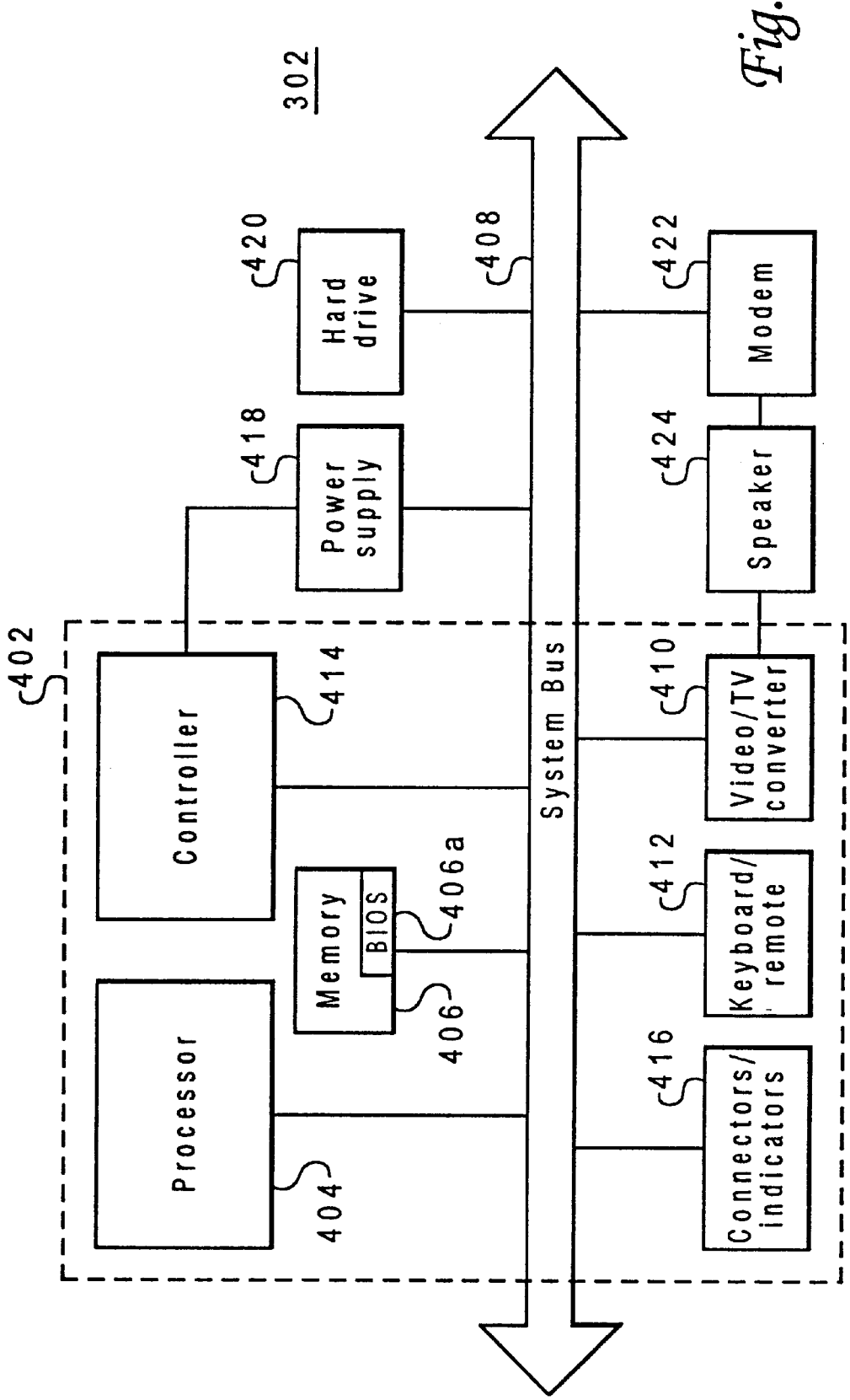
FIG. 4 is a block diagram of the major components of data processing unit which may be implemented as a user unit in accordance with a preferred embodiment of the present invention.

Referring now to FIG. 4, a block diagram for the major components of data processing unit 302 in accordance with a preferred embodiment of the present invention is portrayed. As with conventional personal computers, data processing unit 302 includes a motherboard 402 containing a processor 404 and memory 406 connected to system bus 408. Processor 405 is preferably at least a 486 processor operating at or above 100 MHz. Memory 406 includes read only memory (ROM) 406a containing a basic input/output services (BIOS) routine and may include cache memory and/or video RAM.

Video/TV converter 410 on motherboard 402 and connected to system bus 408 generates computer video signals for computer monitors, a composite television signal, and an S-Video signal. The functionality of video/TV converter 410 may be provided utilizing commercially available video and converter chips. Keyboard/remote control interface unit 412 on motherboard 402 receives keyboard codes through controller 414, regardless of whether a wired keyboard/pointing device or an infrared keyboard/remote control is being employed. Infrared remote control unit 306 transmits signals which are ultimately sent to the serial port as control signals generated by conventional mouse or pointing device movements. Two buttons on remote control unit 306 are interpreted identically to the two buttons on a conventional mouse, while the remainder of the buttons transmit signals corresponding to keystrokes on an infrared keyboard. Thus, remote control unit 306 has a subset of the functions provided by an infrared keyboard. Connectors/indicators 416 on motherboard 402 provide the connections and indicators on data processing unit 302 described above.

External to motherboard 402 in the depicted example are power supply 418, hard drive 420, modem 422, and speaker 424. Power supply 418 is a conventional power supply except that it receives a control signal from controller 414 which effects shut down of all power to motherboard 402, hard drive 420, and modem 422. In some recovery situations, removing power and rebooting is the only guaranteed method of resetting all of these devices to a known state. Thus, power supply 418, in response to a signal from controller 414, is capable of powering down and restarting data processing unit 302.

Hard drive 420 contains operating system and applications software for data processing unit 302, which preferably includes: IBM DOS 7.0, a product of International Business Machines Corporation in Armonk, N.Y.; Windows 3.1, a product Microsoft Corporation in Redmond, Wash.; and Netscape Navigator, a product of Netscape Communications Corporation in Mountain View, Calif. Data may also be stored on hard drive 420. Modem 422, inserted into a slot mounted sideways on motherboard 402, is preferably a 33.6 kbps modem supporting the V.42bis, V34bis, V.34, V.17 Fax, MNP 1–5, and AT command sets. Hard drive 420 may also store data, such as a list of favorite internet sites or unviewed downloads from an internet site. Additionally, hard drive 420 contains instructions necessary to establish a communications link with a service provider and initiate a configuration process for the data processing system.

Controller 414 is preferably one or more of the 805× family controllers. Controller 414 is continuously powered and, when data processing unit 302 is turned on, monitors the system for a periodic "ping" indicating that data processing unit 302 is operating normally. In the event that controller 414 does not receive a ping within a prescribed timeout period, controller 414 removes power from the system and restarts the system. This may be necessary, for example, when the system experiences a general protection fault. If multiple attempts to restart the system prove unsuccessful, controller 414 shuts off data processing unit 302 and signals that service is required through indicators 416. Thus, data processing unit 302 is capable of self-recovery in some circumstances without involvement by a user.

Controller 414 also receives and processes input from infrared remote control 306, infrared keyboard, wired keyboard, or wired mouse. When one keyboard or pointing device is used, all others are locked out (ignored) until none have been active for a prescribed period. Then the first keyboard or pointing device to generate activity locks out all others. Controller 414 also directly controls all LED indicators except that indicating modem use and specifies the boot sector selection during any power off-on cycle.

Those skilled in the art will recognize that the components depicted in FIGS. 3 and 4 and described above may be varied for specific applications or embodiments. Such variations in which the present invention may be implemented are considered to be within the spirit and scope of the present invention.

Figure 5:
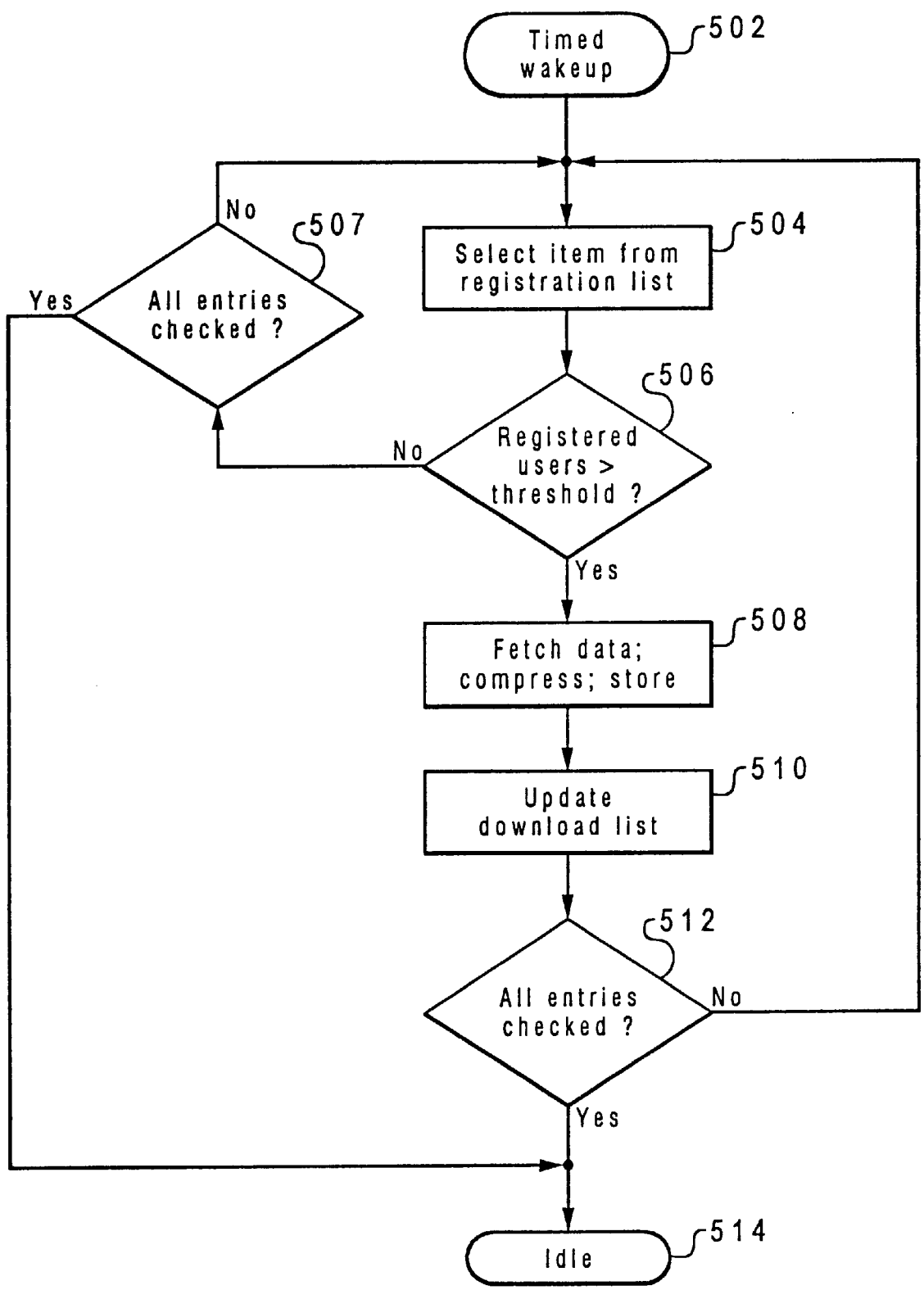
FIG. 5 depicts a high level flowchart for a process for precaching data at a server in accordance with a preferred embodiment of the present invention.

With reference now to FIG. 5, a high level flowchart for a process for precaching data at a server in accordance with a preferred embodiment of the present invention is depicted. The process may be executed by a Web server during off-peak hours or may be continuously run throughout a day or a span of several days as a background application.

The process depicted begins at step 502, which depicts a timed "wakeup" or automatic initiation of the process based on the server system clock or some other event within the server. The timing of the download initiation may be coordinated with the scheduling of automatic downloads by user units. For example, if the user units utilizing the server are all configured to make automatic downloads between 3:00 a.m. and 5:00 a.m., the server may be configured to start the process at approximately 1:00 a.m. so that the necessary downloads to the server are complete in time for the user unit downloads. Alternatively, the respective automatic downloads may be overlapped, with individual downloads to the server being completed prior to requests from the user units. This alternative may be appropriate if the process is run as a background application.

The process then passes to step 504, which illustrates selecting an item from a registration list for data to be precached at the server. The registration list contains identifications of information which clients or user units download on a periodic basis (e.g., every night or once a week) together with an associated number of users currently registered for each identified information. The registration list may contain, for example, a list of URLs for various Web pages frequently requested by a user or client.

The registration list may be generated by specific user requests that entries be added to the registration list, by monitoring user transfers for periodic transfer from the same source, or both. For example, the registration list may be generated by compiling specific off-peak information retrieval requests from clients employing the server at which Web data is to be precached, or by examining the "bookmarks" or "favorites" lists for a client's Web browser. Alternatively, a client's Web browser may be configured so that adding a URL to a bookmark list initiated a query to the client regarding adding the URL to an off-peak retrieval list.

The registration list may be maintained by monitoring actual user transfers and comparing them to registration requests, decrementing the request number associated with an item when a user which requested that item does not download the item for longer than a threshold period (i.e., a month). In this manner, requested items which have been "abandoned" or unused by a requesting user may be culled from the registration list. For example, a user unit may monitor whether downloads are viewed and, after a period of time during which a specific download is not viewed, terminate automatic download of such data.

From step 504, the process passes to step 506, which depicts a determination of whether the number of clients or user units registered for periodic downloads of the item selected exceeds a threshold. The threshold is determined by the efficiency of precaching the downloads for the selected item. For example, if a single user only is registered for a specific download, it may be more efficient to simply allow that user to download the requested data directly, rather than precaching the download at the server. The threshold for individual items on the registration list may be dependently set on whether the item was specifically requested for off-peak information retrieval by a user or was merely added to the registration list based on a frequency of requests for this item.

If less than the threshold number of users are registered for the selected item, the process proceeds to step 507, which depicts a determination of whether all entries have been checked. If so, the process proceeds to step 514, described below. If not, however, the process returns to step 504 for selection of a different item. If at least the threshold number of users are registered for the selected item, the process proceeds to step 508, which illustrates fetching the data identified by the selected item, compressing the data, and storing it at the server. Any suitable compression utility may be utilized for compressing the data.

In a preferred embodiment, the data fetched comprises Web pages from a Web site on the Internet. The number of Web pages retrieved is determined by rules or heuristics for deciding which Web pages and subpages are most likely to be accessed by a user. The Web pages downloaded each consist of a number of files or components. Therefore, a prior download of Web page components stored on the server but which were updated or are no longer referenced in the Web pages retrieved may be deleted as part of this step. Web pages obtained from different sites may be compressed and stored separately to facilitate distribution to each user only the pages requested by that user. Thus each server acts as a mirror site only for the specific Web sites requested for off-peak retrieval by users utilizing that server.

The process then passes to step 510, which depicts updating a download list containing a list of items precached at the server for client downloads. The download list may contain other information, such as the time and date of each downloaded component. The process next passes to step 512, which illustrates a determination of whether all entries or items in the registration list have been checked. If not, the process returns to step 504 for selection of another item in the registration list. If so, however, the process proceeds to step 514, which depicts the process becoming idle until the next timed precache download is initiated.

Figure 6:
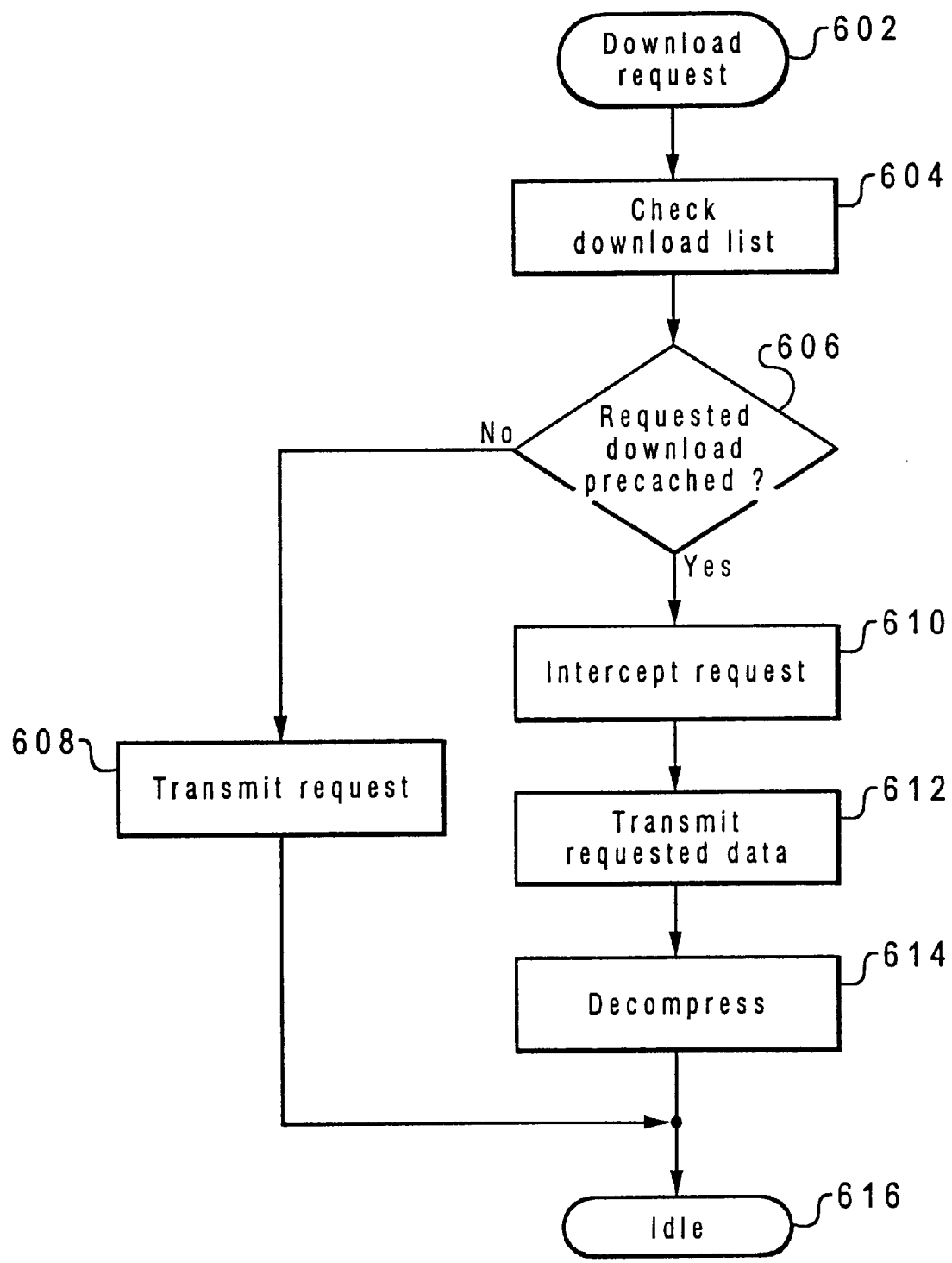
FIG. 6 is a high level flowchart for a process for transmitting precached downloads to a user unit in accordance with a preferred embodiment of the present invention.

Referring to FIG. 6, a high level flowchart for a process for transmitting precached downloads to a user unit (or Web client) in accordance with a preferred embodiment of the present invention is portrayed. The process begins at step 602, which depicts a server receiving a download request, such as an automatic, timed off-peak retrieval request for a particular Web page or an on-line request made at dialup. The request may contain an URL for a particular Web site, as described below. The process passes next to step 604, which illustrates checking the download list of precached downloads at the server, and then to step 606, which depicts a determination of whether the requested download is precached at the server. If not, the process proceeds to step 608, which illustrates transmitting the download requested to the appropriate location. The process then passes to step 616, which depicts the process becoming idle until the next download request is received.

If the requested download is precached at the server, the process passes instead to step 610, which illustrates interception of the download request by the server. The process next passes to step 612, which depicts transmission of the requested download data from the server to the requesting user unit or Web client. The requested data is stored in a local memory, such as a hard disk drive, in the user unit. The process then passes to step 614, which illustrates the user unit automatically decompressing the downloaded data. The process then passes to step 616, which depicts the process becoming idle until the next download request is received.

Figure 7:
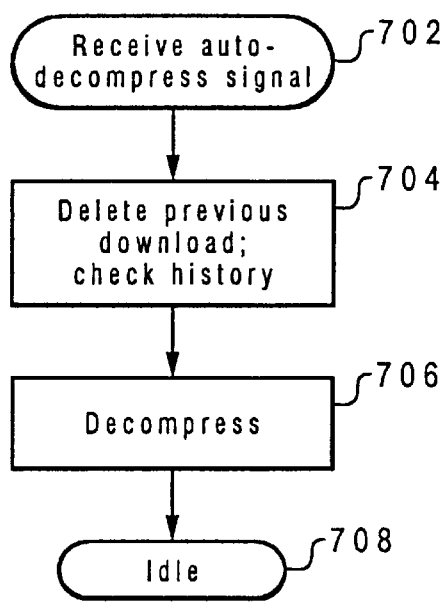
FIG. 7 depicts a high level flowchart for a process for handling precached downloads received from a server at a user unit in accordance with a preferred embodiment of the present invention.

With reference now to FIG. 7, a high level flowchart for a process for handling precached downloads received from a server at a user unit in accordance with a preferred embodiment of the present invention is depicted. The process begins at step 702, which illustrates the user unit receiving a precached download from the server. The process then passes to step 704, which illustrates deleting the previous download of a similar nature (i.e. older versions of the downloaded Web page components) received from the server. The process passes next to step 706, which depicts automatically decompressing the download at the time it is received to speed viewing. The process then passes to step 708, which illustrates the process becoming idle until another download is received.

Figure 8:
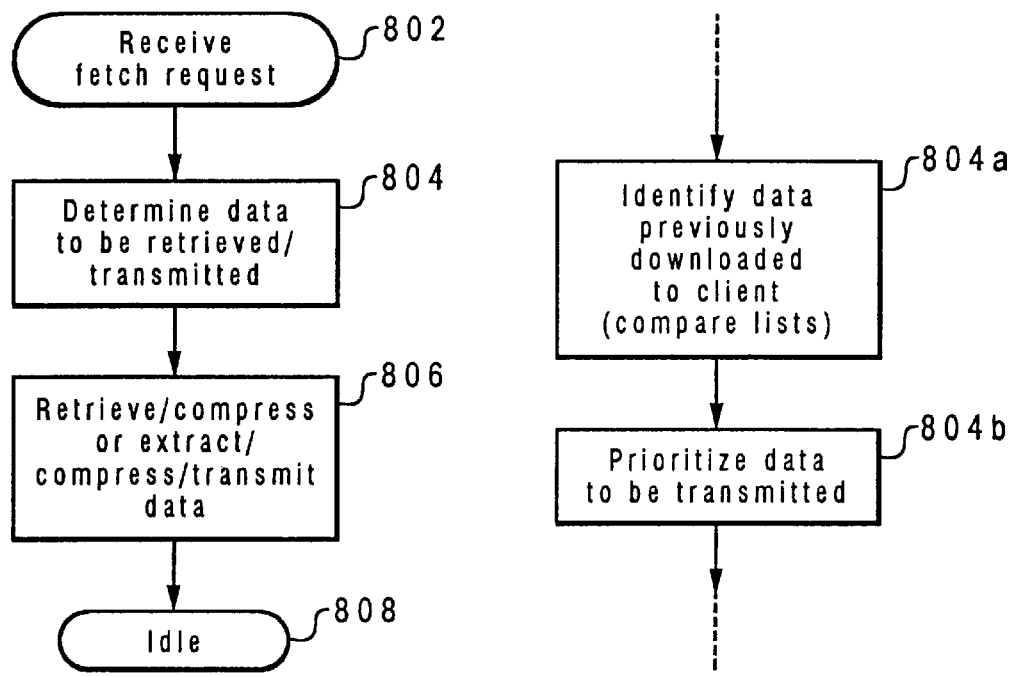
FIG. 8 is a high level flowchart for a process for retrieving data from a Web site or server cache in accordance with a preferred embodiment of the present invention.

Referring to FIG. 8, a high level flowchart for a process for retrieving data from a Web site or server cache in accordance with a preferred embodiment of the present invention is portrayed. The process illustrated is employed, as a whole or in part, to retrieve information from a Web site for precaching at a Web server as depicted in step 508 of FIG. 5 or from a Web server for storage on a Web client's hard drive as described in connection with step 612 in FIG. 6.

The process for retrieval of information for precaching at a server requires more than a simple fetch, and must be adapted to the realities of off-peak information retrieval. It is anticipated that user requests for off-peak retrieval will far exceed the capacity of the bandwidth, time, and resources available to satisfy such requests. That is, the requests, if satisfied, would consume more resources than could practically be made available. Thus, the process of retrieving data for precaching must analyze the requests and the data requested and fetch data in an intelligent manner.

Web pages, or hypertext documents, are retrieved through an URL identifying the communications source for the page. The URL is typically of the form "www.domainname.ext/filepath/filename". The domain name and extension identify a specific Web site (Web domain or server) containing the requested information. The requested information will comprise a file or a group of files organized within directories on the Web site which is the subject of the request. Thus, the URL must include a path to the files containing the information requested and may also require a filename. No extension need be specified for the filename since only HTML files are displayed by the browser and a default extension of ".html" or ".htm" is assumed. If no filename is specified in the request, the browser searches for an HTML file named "default" or "index" at the specified Web domain and path.

Web pages at a particular location (or domain) comprise an HTML file or plurality of HTML files together with associated graphics, sound, motion video, and executable script files. An HTML file forming part of a Web page will frequently include references to graphics files such as images in JPEG or GIF format, sound files such as audio information in WAV or MIDI format, motion video files such video information in MPEG format, and/or executable script files such as JAVA, JAVASCRIPT, or Common Gateway Interface (CGI) script files. More importantly, an HTML file will typically contain "links," or embedded references including URLs for "jumping" to (or, in reality, retrieving) other HTML files. These other HTML files may be local (located at the same Web domain, although perhaps at a different path) or remote (located on a different Web domain or server).

Display of a Web Page by a browser requires retrieval of at least one HTML file formatting the Web page to be displayed and each graphics, sound, motion video, and script file referenced in the HTML file(s). Additionally, effectively caching a Web page requires that links within the page be resolved and data retrieved for display. The pages referenced by the links may themselves contain links to still other pages, and so on. In this manner, a single offline browsing request could conceivably request a page containing the root of a link "tree" which, if fully expanded, would include virtually every Web page currently published. Moreover, a client's off-peak retrieval time may be limited for the reasons described above. For these reasons, the process for retrieving data to or from a server cache must be intelligently implemented.

The process depicted begins at step 802, which depicts receiving a fetch request. The fetch request may be received by the server in an off-peak retrieval request by a client, or as part of a retrieval process for precaching by the server. The process then passes to step 804, which illustrates determining the information to be retrieved or transmitted pursuant to the request. The information retrieved from a Web site for caching at a server or transmitted from a server cache to a client is selected using a set of rules or heuristic to identify files most likely to satisfy a user's interest without inordinately taxing available resources.

In the server caching context, the rules for determining which Web site files to retrieve for caching at the server are driven by the twin goals of obtaining a span of pages likely to interest a client and restricting the cache data to an appropriate size given the total cache size available. A broad sampling of the files associated with a Web page should be retrieved without devoting an unreasonable amount of system resources to following a specific series, or path, of links.

For example, if a particular news page site was of interest to users, the system would initially retrieve the news sites initial or default HTML file and graphics, scripts, etc. referenced within that file. The set of files comprising the default HTML file and closely associated graphics, scripts, etc. is sometimes also called a "home page." In general, any HTML file together with the graphics, sound, motion video, and/or script files referenced within the text of the HTML file may be referred to as a "page." The same graphics, sound, motion video, and/or script files may be associated with or referenced by more than one HTML file and therefore may be found in more than one page. In contrast to graphics, sound, motion video, and/or script files, references to separate HTML files, or links within a page, are references to distinct pages. In general, when retrieving Web site information for caching, complete pages are preferably retrieved rather than partial pages (e.g., ignoring sound files), unless size constraints would be violated (e.g., the page includes unusually large motion video files).

Next, the system would begin resolving links within the news site's home page, following these links to other pages and retrieving those pages. Links within these second level pages are followed, and the process continues recursively until the link tree originating with the home page is fully exhausted or a threshold is exceeded. The threshold may be determined by a number of files retrieved, a quantity of bytes retrieved, or a time spent in retrieving files. Since it will most commonly be the case that the selected threshold will be exceeded before the link tree is exhausted, a mechanism must be provided for identifying the most preferred pages within the link tree to retrieve.

Many pages include facilities for monitoring the number of users which access that specific page. This statistical information may therefore be employed to identify the most popular areas of a site for preferential retrieval. A "breadth first" retrieval system may be employed, either in conjunction with or in lieu of employing statistical information to identify most popular pages. A "breadth first" system would retrieve all pages, either as a whole or in similar amounts, from a given level of a link tree before proceeding to a subsequent level of the link tree. This is in contrast to a "depth first" retrieval system, which would fully exhaust all levels for a specific path within the link tree before addressing branches from that path at various levels. One "breadth first" method of caching is described in copending, commonly assigned application entitled "Method for Optimizing Off-Peak Caching of Data" by J. Thompson and V. Berstis, Ser. No. 08/797,902, filed Feb. 10, 1997, which is hereby incorporated by reference.

Still another rule for page retrieval, which may be implemented in conjunction with the systems described above, may be to prefer pages at the same site (i.e. identified by the same domain name within the page URL) to pages located at different sites. The rule may be extended to prefer pages in the same directory at a given site to pages in different directories. A site-based preference allows filtration of so-called "superlink" pages from the retrieval. Superlink pages contain links to a plethora of sites in the Web, often serving a resource locator for a particular area of interest. Following all links within a superlink page could quickly consume available system resources. A page link count may also be employed in conjunction with a site-based preference, ignoring links with a page containing more than a threshold number of, for example, 100. Again, such a large number of links would quickly exhaust available resources if fully resolved.

In the client retrieval context, the rules for determining what information is to be transmitted to the client during off-peak information retrieval are based on similar goals of providing pages of interest to the client and remaining within a threshold of allocated resources. An overriding concern with minimizing connection time by the off-peak retrieval is also present in the context of downloading cached information to the users. This allows larger numbers of clients to be fairly provided quality service. In this regard, limitations on time and bandwidth for off-peak retrieval may be more strict.

Due to contextual differences, the rules for determining what information is to be transmitted to the client are somewhat different. For example, if the client has never before downloaded a specific cached site, the entire content of that site (every page) must be downloaded. If the user is limited to one hour of off-peak information retrieval per night, it may not be possible to download all pages to the client in a single night. Several nights may be required to download a specific site. Therefore, a priority system must be established for downloaded content.

It must be remembered that the Web pages for a requested site are being effectively mirrored at the user unit for off-line browsing. A distinction must be made between users downloading a new site for the first time and existing subscribers merely requiring an update. For a large Web site, it may not be possible to download to a first time subscriber all files required for the requested site in a single night. Instead, it may be necessary to download the Web site files to the new subscriber over a period of several nights. In this context, it may be preferable not to download complete pages so that the user may still be able to view some content of the requested Web site while awaiting the complete off-peak retrieval to be complete for off-line browsing. For example, the sound files associated with a page may be considered lower priority than the HTML and associated graphics files. Thus, all sound files for a given site may be assigned the lowest download priority, downloaded on the last night. Additionally, statistically based, breadth-first, and site- or directory-based preferences as described above may be employed for determining which pages are selected for downloading.

In the client download context, the goal of minimizing connection time also elevates considerations of information overlap. For example, if the same graphics files is used in a many pages for the specific site, as might occur with a logo image, that graphics file may be assigned a higher download priority than other files for the same site. Another scenario invoking this consideration is whether the client has already downloaded information for a given site, and merely requires an update, as might occur with a daily news site employing the same advertisements. Comparison of file dates and sizes in the server cache with those present on a client's system will reveal the changes which must be updated for the client. Alternatively, a listing of the files previously downloaded to the client may be maintained. This may be preferable since a listing of the services to which an individual client subscribes must be maintained in any event. Such listings also provide a resource for updating the registration list of sites to cache and for culling the files previously downloaded to the client.

An expanded view of the process for step 804 for the client download context is depicted in FIG. 8. In the client download context, the determination of what data to transmit begins with step 804a, which illustrates identifying the data already downloaded to the client, if any, for the requested Web site. The example depicted assumes that a list of files downloaded to the client for a given Web site is maintained, either on the client's machine or the server. This may be compared to a list of current files for the Web site, with changes identified by discrepancies in file name, date, or size. The process then passes to step 804b, which illustrates prioritizing data to be downloaded according to the rules described above or similar rules.

The process depicted may be employed as part of a multicasting process, where the same stream of information is provided to different recipients simultaneously. It may be, for example, that a number of users subscribe to off-peak retrieval for the same news site and therefore require the same update. If the individual download processes may be coordinated to receive the same stream of information, a single server process may employed to update each respective user. Multicasting may be particularly useful where there are multiple user units in a single household.

Once the data to be transmitted or retrieved is identified in step 804, the process passes to step 806, which depicts retrieving the identified information and compressing it for storage at the server, or extracting the identified information from a compressed cache file, compressing it, and transmitting it to the client. In the client download context, the concern with minimizing connection time also elevates the importance of compression in transmitting cached data to the client. Compressing a body of Web site information in a single file at the server is not a serious impediment to selective transmission of pages or files from that Web site information to the client. Known algorithms allow files to be extracted from compressed archives and compressed on the fly during transmission, so that only selected pages or files from the information need be transmitted, and may be transmitted in compressed form to reduce connection time.

It is anticipated that Web sites will eventually implement cache-optimized pages. For example, a Web site may configure pages with knowledge of the rules used to prioritize caching and downloads, creating cache-optimized pages for preferential caching and downloading to clients. Web publishers may alternatively include comments identifying which pages and/or files are part of the same Web "publication" and which links reference pages for distinct publications. Web sites which update pages on a periodic basis may compress the updated or changed files for the Web site in a single bundle for efficient retrieval. Where a server provides off-line subscriptions to such a Web site, the server need only act as a mirror for the compressed, changed files.

It is important to note that while the present invention has been described in the context of a fully functional data processing system, those skilled in the art will appreciate that the mechanism of the present invention is capable of being distributed in the form of a computer readable medium of instructions in a variety of forms, and that the present invention applies equally regardless of the particular type of signal bearing media used to actually carry out the distribution. Examples of computer readable media include: recordable type media such as floppy disks and CD-ROMs and transmission type media such as digital and analog communication links.

The present invention provides an efficient means of distributing data from a plurality of sources to a plurality of destinations in situations where the all of the data necessarily passes through the same node during the separate transfers. The bandwidth requirements from a server to the Internet are decreased by precaching or "mirroring" information requested by multiple users at the server. The requested information is compressed to occupy less space at the server and to speed transfer to the user.

While the invention has been particularly shown and described with reference to a preferred embodiment, it will be understood by those skilled in the art that various changes in form and detail may be made therein without departing from the spirit and scope of the invention.

What is claimed is:

1. A method in a data processing system of efficient distribution of precached data to a plurality of users, comprising:
   monitoring user data requests at an intermediate server employed by a plurality of users to access data on one or more content servers;
   selecting data located on the one or more content servers for perfetching based on a historical probability that a threshold number of users employing the intermediate server will repetitively access the selected data; and
   transmitting current versions of the selected data to the intermediate server in a compressed form.

2. The method of claim 1, wherein the step of monitoring user data requests at an intermediate server employed by a plurality of users to access data on one or more content servers further comprises:
   receiving an off-peak information retrieval request for a Web site.

3. The method of claim 1, wherein the step of monitoring user data requests at an intermediate server employed by a plurality of users to access data on one or more content servers further comprises:
   receiving a browsing request for a Web site from a registration list of browsing requests for a plurality of Web sites.

4. The method of claim 1, further comprising:
   collecting a registration list of browsing requests for a plurality of Web sites.

5. The method of claim 4, wherein the step of collecting a registration list of browsing requests for a plurality of Web sites further comprises:
   culling the registration list to eliminate abandoned browsing requests.

6. The method of claim 1, further comprising:
   compressing the selected data for transmission to the intermediate server.

7. The method of claim 1, wherein the step of monitoring user data requests at an intermediate server employed by a plurality of users to access data on one or more content servers further comprises:
   receiving a request for a page of data from a Web site.

8. The method of claim 1, wherein
   the step of selecting data located on the one or more content servers for prefetching based on a historical probability that a threshold number of users employing the intermediate server will repetitively access the selected data further comprises selecting a portion of the data from the Web site which is not already present in the intermediate server for transmission to the intermediate server.

9. The method of claim 8, wherein the step of selecting a portion of the data from the Web site further comprises:
   selecting complete pages from the Web site which are not already present in the intermediate server and are likely to be accessed by at least one user of the intermediate server, unless the complete pages violate a size constraint.

10. The method of claim 8, wherein the step of selecting a portion of the data from the Web site further comprises:
    selecting complete pages from the Web site which are not already present in the intermediate server and are likely to be accessed by at least one user of the intermediate server up to a size constraint selected from the group consisting of a number of files, a quantity of bytes, and a time limit.

11. The method of claim 1, wherein the step of selecting data located on the one or more content servers for prefetching based on a historical probability that a threshold number of users employing the intermediate server will repetitively access the selected data further comprises selecting pages linked to the at least one page of data previously selected for transmission to the intermediate server.

12. The method of claim 1, wherein:
    the step of receiving a request for data from a system further comprises receiving a request for a page from a Web site;
    the step of identifying requested data which is not already present in the system further comprises identifying pages linked to the requested page from the Web site which are not already present in the system; and
    the step of selecting a portion of the identified requested data for transmission to the system further comprises selecting pages linked to the requested page from the Web site which are likely to be accessed by a user.

13. The method of claim 1, further comprising:
    identifying updated data within the selected data which is not already present in the intermediate server;
    selecting only the updated data for transmission to the intermediate server; and
    transmitting the selected updated data to the intermediate server in a compressed form.

14. The method of claim 1, wherein the step of selecting the identified the updated data for transmission to the intermediate server further comprises selecting updated portions, not already in the intermediate server, of pages linked to at least one page which is likely to be accessed by a user of the intermediate server.

15. An apparatus for efficient distribution of precached data to a plurality of users, comprising:
    monitoring means for monitoring user data requests at an intermediate server employed by a plurality of users to access data on one or more content servers:
    selection means for selecting data located on the one or more content servers for prefetching based on a historical probability that a threshold number of users employing the intermediate server will repetitively access the selected data; and
    transmission means for transmitting current versions of the selected data to the intermediate server in a compressed form.

16. The apparatus of claim 15, further comprising:
compression means for compressing the selected data for transmission to the intermediate server.

17. The apparatus of claim 15, wherein the monitoring means further comprises:
means for receiving a request for a page of data from a Web site.

18. The apparatus of claim 17, wherein:
the monitoring means further comprises means for receiving a request for data from a Web site; and
the selection means further comprises means for selecting updated data from the Web site which is not already present in the intermediate server for transmission to the intermediate server.

19. The apparatus of claim 18, wherein the selection means further comprises:
means for selecting pages from the Web site which are not already present in the intermediate server and are likely to be accessed by at least one user of the intermediate server.

20. The apparatus of claim 18, wherein:
the selection means further comprises means for selecting pages linked to at least one page of data already in the intermediate server for transmission to the intermediate server.

21. The apparatus of claim 18, wherein:
the selection means further comprises means for selecting pages linked to a previously selected page from a Web site which are likely to be accessed by at least one user of the intermediate server.

22. The apparatus of claim 18, further comprising:
identifying means for identifying updated data within the selected data which is not already present in the intermediate server;
selection means for selecting only the updated data for transmission to the intermediate server; and
transmission means for transmitting the selected updated data to the intermediate server in a compressed form.

23. The apparatus of claim 18, wherein the selection means further comprises means for selecting updated portions, not already in the intermediate server system, of pages linked to at least one page which is likely to be accessed by at least one user of the intermediate server.

24. A computer program product for use with a data processing system, comprising:
a computer usable medium;
first instructions on the computer usable medium for monitoring user data requests at an intermediate server employed by a plurality of users to access data on one or more content servers;
second instructions on the computer usable medium for selecting data located on the one or more content servers for prefetching based on a historical probability that a threshold number of users employing the intermediate server will repetitively access the selected data; and
third instructions on the computer usable medium for transmitting current versions of the selected data to the intermediate server in a compressed form.

25. The computer program product of claim 24, wherein the computer usable medium is a hard disk drive.

26. A method of efficiently distributing data to a plurality of users of an intermediate server system employed by the plurality of users to access data from at least one content server, comprising:
receiving requests for data from the plurality of users;
based on the received requests, selecting data likely to be repetitively accessed by a threshold number of the plurality of users from a larger pool of available data;
precaching the selected data at the intermediate server system; and
upon connection of an individual user within the plurality of users to the intermediate server system, transmitting a portion of data from the precached data to the individual user in compressed form prior to receiving a request from the individual user for the portion of precached data, the portion of precached data selected on the basis of a prior received request from the individual user.

* * * * *

UNITED STATES PATENT AND TRADEMARK OFFICE
CERTIFICATE OF CORRECTION

PATENT NO. : 6,182,122 B1
DATED : January 30, 2001
INVENTOR(S) : Viktors Berstis Page 1 of 1

It is certified that error appears in the above-identified patent and that said Letters Patent is hereby corrected as shown below:

<u>Column 14,</u>
Line 50, please delete the words "the indentified".

Signed and Sealed this

Sixteenth Day of October, 2001

Attest:

*Nicholas P. Godici*

NICHOLAS P. GODICI
*Attesting Officer*  *Acting Director of the United States Patent and Trademark Office*